United States Patent [19]

Kikuchi

[11] Patent Number: 5,616,963
[45] Date of Patent: Apr. 1, 1997

[54] WIND POWER GENERATOR WITH AUTOMATIC REGULATION OF BLADE PITCH IN RESPONSE TO WIND SPEED BY MEANS OF SPRING MOUNTED BLADES

[76] Inventor: Naomi Kikuchi, 206 Kamiyachi, Niigata, Japan

[21] Appl. No.: 485,027

[22] Filed: Jun. 7, 1995

[30] Foreign Application Priority Data

Nov. 2, 1994 [JP] Japan .................................. 6-270007

[51] Int. Cl.⁶ .................................. F03D 7/04; F03D 9/00
[52] U.S. Cl. .......................... 290/55; 416/53; 416/132 B
[58] Field of Search .................... 290/44, 55; 60/332, 60/354, 356; 416/27, 53, 131, 132 B, 136, 206

[56] References Cited

U.S. PATENT DOCUMENTS

| 399,171 | 3/1889 | Townsend | 416/139 |
|---|---|---|---|
| 588,143 | 8/1897 | Hall | 416/98 |
| 2,493,895 | 1/1950 | Osterback | 416/138 R |
| 2,974,731 | 3/1961 | Mader | 416/132 R |
| 4,360,315 | 11/1982 | Olson | 416/41 |
| 4,566,853 | 1/1986 | Likitanupak | 416/117 |
| 4,673,822 | 6/1987 | Kikuchi | 290/44 |
| 4,818,181 | 4/1989 | Kodric | 416/196 A |

FOREIGN PATENT DOCUMENTS 62-113868  5/1987  Japan .

*Primary Examiner*—Steven L. Stephan
*Assistant Examiner*—Christopher Cuneo
*Attorney, Agent, or Firm*—Quarles & Brady

[57] ABSTRACT

A wind power generator having a plurality of wind mill blades whose pitch angles stably vary depending upon the wind power. A plurality of spokes radially extend from a horizontal power shaft. A plurality of protrusions respectively projecting from the spokes and the wind mill blades are paired with opposite protrusions by connector shaft. Each blade is rockable within a range from an extremely inclined position to a plane perpendicular to the power shaft to neary 90 degrees to the plane. One side of the wind mill blade strikes on the spoke at the above extremely inclined position. A plurality of blade springs are sandwiched in a compressed state between the spokes and the wind mill blades, surrouding the connector shafts respectively. Thus, each blade is biased toward the closing direction relative to the plane. If the wind is not so strong, each blade faces it to rotate the power shaft. If the wind is too strong, the blade is aligned to the direction of the wind against the blade spring, thereby preventing damage to the blades.

3 Claims, 5 Drawing Sheets

F I G. 3
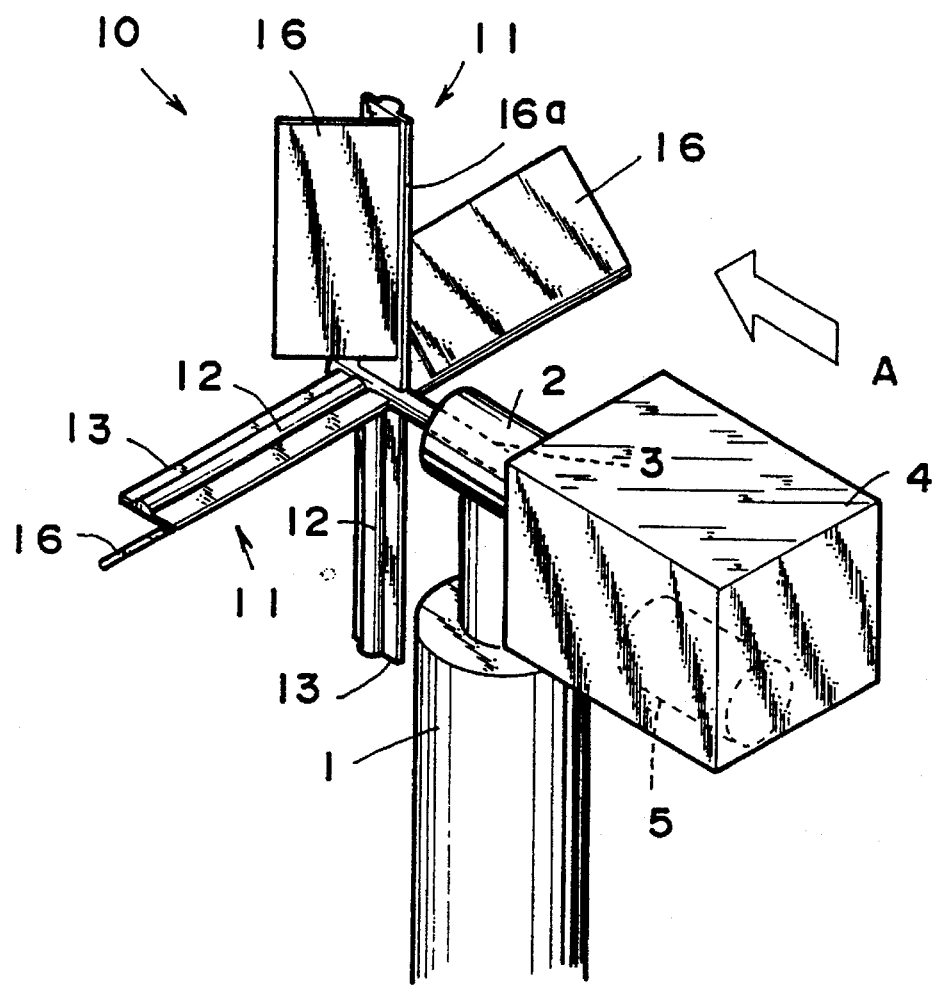

WIND POWER GENERATOR WITH AUTOMATIC REGULATION OF BLADE PITCH IN RESPONSE TO WIND SPEED BY MEANS OF SPRING MOUNTED BLADES

BACKGROUND OF THE INVENTION (a) Field of the Invention

The present invention relates to a wind power generator or wind-driven electric generator, specifically having a rotation axis changeable depending on the direction of wind power.

(b) Description of Prior Art

Conventionaly, there has been proposed a propeller-type generator wherein a plurality of propeller blades are radially extending from power shaft which is horizontally and rotatably supported. However, as such prior propeller-type wind power generator cannot enlarge each width of the propellers, its propeller diameter must be enlarged instead, thus being large-sized in general. Further, such fixed propeller blades are prone to break due to a strong wind.

Whilst, there is also proposed another propeller-type wind power generator having rotatable blades whose angles to a plane perpendicular to the power shaft is variable, wherein a computer can control such angles, depending on wind power. However, according to such control by computer, the apparatus will have relatively complicated construction as well as late reaction to wind, particularly a strong gust of wind, thus sometimes causing the blades to break.

Further, there is also proposed another wind power generator in Japanese Patent Laid-Open No. 62-113868, wherein a plurality of blades are rockably supported by each spoke radially provided on a power shaft, and each blade is biased toward a closing direction with respect to the plane perpendicular to the power shaft with the use of springs. The wind power generator has mounting rings of connectors protruding from the blades, which are axially supported by cylindrical spokes, each having one end of a coil spring fixed to the spoke and the other end fixed to the blade. Namely, when the wind is not so strong, the blades will be inclined to the above-mentioned plane owing to the springs (i.e., pitch angle becoming large), and the blades will be rotated together with the power shaft by the wind. On the other hand, when the wind becomes strong to a certian degree, the blades will become nearly perpendicular to the plane owing to the wind power against the springs (i.e., pitch angle becoming small), thus preventing the damage to the blades.

However, according to the prior art, as the setting of spring force needs fine adjustment, it is difficult to stabilize the movement of the blades. For example, if the spring force is a little less than its optimized value, the pitch angle of the blades will become smaller, thus preventing efficient generation of electric power. On the other hand, if the spring force is a little more than the value, the blades will become difficult to be rotated by the wind, thus resulting in possible damage to the blades.

As above described, according to the prior wind power generator having angle-variable blades which are supported by spokes and loaded with springs, as the connectors fixed to the blades are axially supported by the spokes and one end of the coil spring is fixed to the spoke, while the other end thereof to blades, the adjustment of the spring force must be carefully done, thus making it difficult to stabilize the movement of the blades.

SUMMARY OF THE INVENTION

Accordingly, it is a primary object of the present invention to provide a wind power generator having blades which may be automatically varied in pitch depending upon wind load conditions. More particularly, a spring is interposed between the blades and a spoke upon which the blade is mounted, for resilient movement of the blade relative to the spoke when the blade is exposed to the wind.

In accordance with a major feature of the present invention, there is provided a wind power generator comprising: a main generator; a power shaft which is horizontally supported, having a horizontal axis of rotation, said rotation being transferred to the main generator; a plurality of spokes radially extending from said power shaft, each spoke comprising a shaft and a plate; a plurality of wind mill blades, each blade being supported by the spoke, rockable within an angular range from 45 degrees to a plane perpendicular to the power shaft where one end of the blade abuts onto the plate of the spoke to nearly 90 degrees to the plane; a plurality of protrusions, each pair of the protrusions projecting from the spoke and the blade, being coupled together by a connector shaft parallel to the spoke; a plurality of springs surrounding the connector shafts, each spring being sandwiched in a compressed state between the spoke and the blade to bias the blade toward the closing direction with respect to the plane.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 3 is a perspective view showing a first embodiment of the invention.

DESCRIPTION OF PREFERRED EMBODIMENTS

Figure 1:
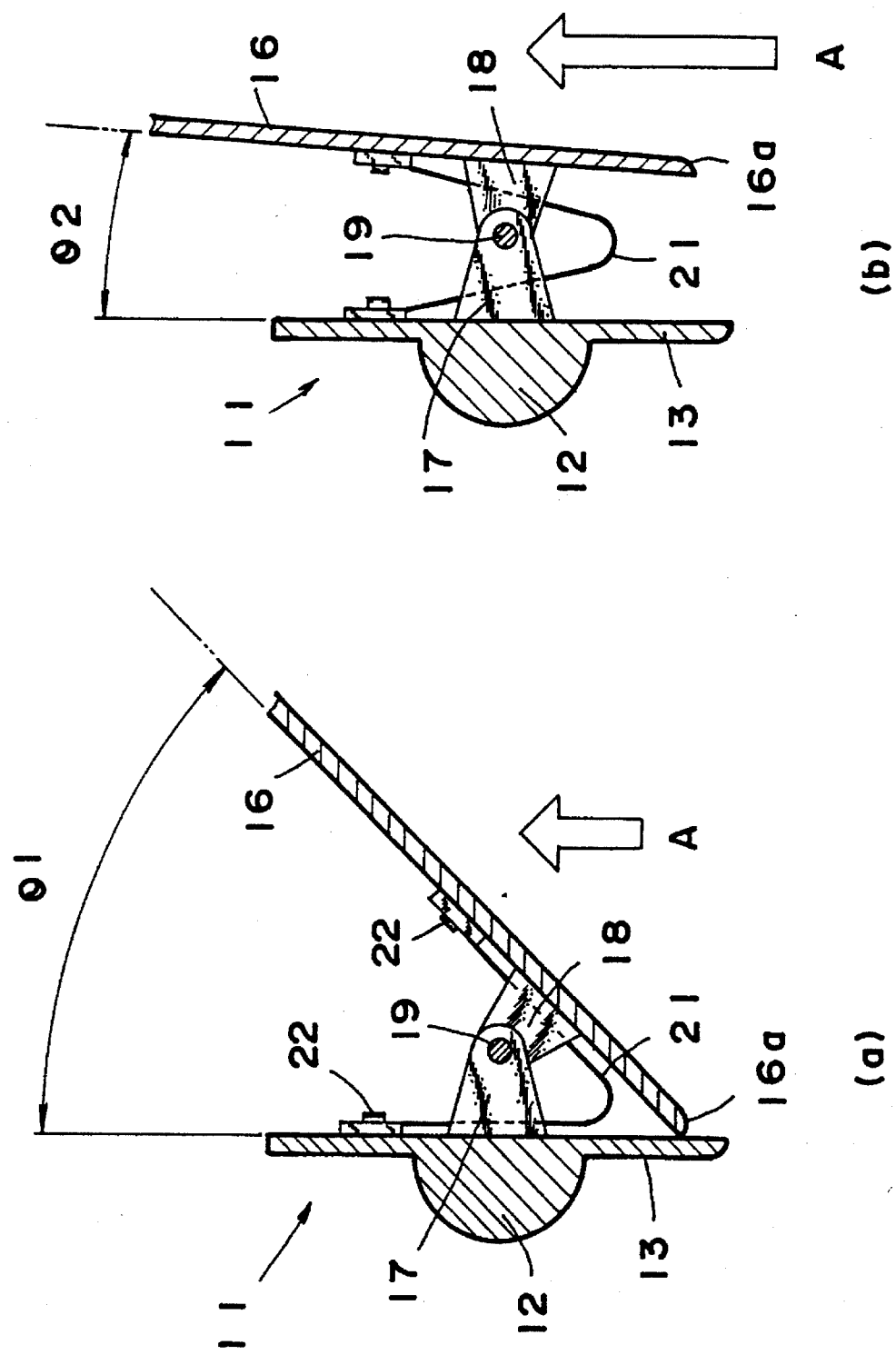
FIGS. 1(a) and 1(b) are each a section showing a spoke and blade of a first embodiment of the invention.
Figure 2:
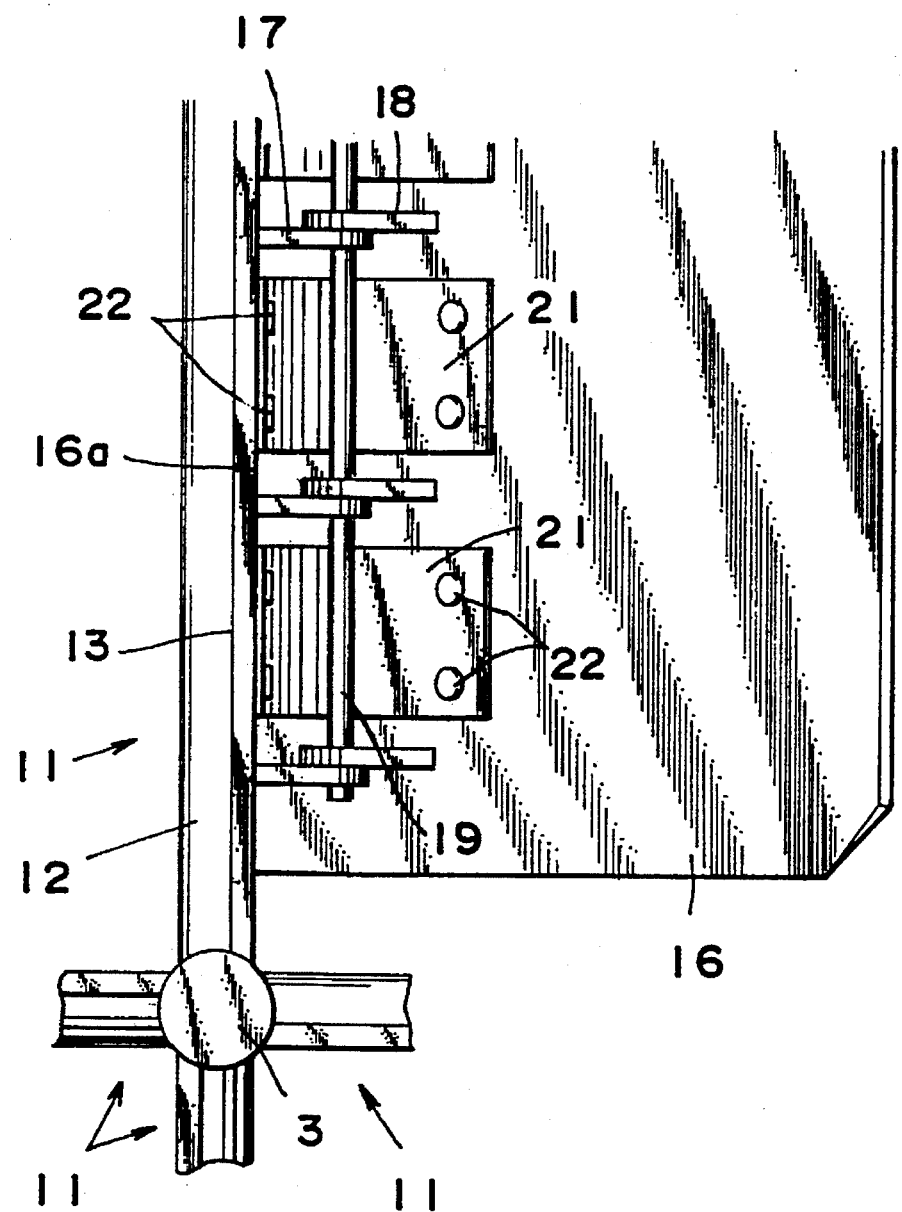
FIG. 2 is a front view showing a spoke and blade of a first embodiment of the invention.

Hereinafter is described a first embodiment of the present invention with reference to FIGS. 1 to 3.

Referring to FIG. 3, reference numeral 1 generally designates a wind mill column, onto which is horizontally and rotatably mounted a power shaft bearing 2, while a power shaft 3 is rotatably supported by the power shaft bearing 2.

At the distal end of the power shaft bearing 2 is provided a casing 4, into which a main generator 5 is housed. The rotation of the power shaft 3 is transferred to the main generator 5 through a speed increasing gear train or the like, thus generating electricity. Whilst, to the proximal end of the power shaft 3 are fixed four spokes 11 of a wind mill 10, which are perpendicular to the power shaft 3 and radially provided respectively. Each of the spokes 11 comprises a shaft 12 and a plate 13, having a blade 16 rockably supported thereby. As can be seen from FIGS. 1 and 2, each blade is supported in such a manner that a pair of protrusions 17, 18 extending from each edge of the spoke 11 and blade 16 are connected by a connector shaft 19. The connector shaft 19 is axially parallel to the spoke 11, while the blade 16 will rock around the connector shaft 19.

Each blade 16 can pivot relative to the spoke upon which it is mounted. As shown in FIGS. 1(a) and 1(b), the amount of pivot is within an angular range of about 45 degrees to nearly 90 degrees, relative to a plane which is defined perpendicular to the power shaft 3. As shown in FIG. 1(a), a side of the blade 16, adjacent to the spoke 11, abuts on the plate 13 when the blade is angled at about 45 degrees. According to the invention, the pitch angle of each blade 16 becomes larger (theta 1) as the blade pivots towards the position shown in FIG. 1(a), and smaller (theta 2) as the blade pivots to the position shown in FIG. 1(b).

Around each connector shaft 19 and between each spoke 11 and blade 16 is sandwiched a blade spring 21 in a compressed state. The blade spring 21 is located at inner sides of the protrusions 17 and 18, with the both ends thereof being secured to the plate 13 and blade 16 by volts 22 respectively. Owing to the blade spring 21, the blade 16 is given a tendency to close itself with respect to the plane perpendicular to the power shaft 3, in other words, given a tendency to enlarge the pitch angle.

Hereinbelow is described an action of the invention structured as the above-mentioned.

The wind power generator of the embodiment is so-called a down-wind type, wherein when the wind mill 10 is affected by the wind A, the power shaft bearing 2 will be horizontally turned and oriented approximately to the direction of the wind A with the wind mill 10 being positioned leeward. Then, the blades 16 affected by the wind will allow the power shaft 3 to rotate together with the wind mill 10, whereby the rotation of the power shaft 3 can be transferred to the main generator 5 to generate electiricity.

As shown in FIG. 1(a), for comparatively a weak wind A at the wind velocity less than 5.5 m per sec., the spring force of the blade spring 21 will get an advantage over the wind power, so that the blade 16 will have its edge 16a strike on the plate 13 of the spoke 11, thus enlarging the pitch angle theta 1.

On the other hand, as shown in FIG. 1(b), for comparatively a strong wind A at the wind velocity of 5.5 m per sec. or above, it can resist the spring force of the blade spring 21, so that the pitch angle theta 2 of the blade 16 will be generally diminished in value, which is to be Zero at the velocity more than 17 m per sec. In such a state, as the force applied to the blade 16 is well balanced, thus preventing the possible damage to the neighbourhood thereof. Incidentally, the wind mill 10 can keep rotating if each blade 16 is folded.

According to the structure thus made, as the wind mill 10 has a plurality of the blades 16 rockably supported by the edges of the spokes 11 respectively, greater width and larger area of the blades 16 can be realized as compared to those of propeller-type wind mill, thereby rotating it to generate electricity if the wind is comparatively weak. Further, as the wind mill 10 of the embodiment does not require such lengthened blades as required in the propeller-type, it can be small-sized in general. In other words, the wind power generator of the embodiment enables a small-sized generator to generate as much electric power as the conventional large-sized generator.

Furthermore, as the spokes 11 and blades 16 have the protrusions 17 and 18 rockably connected by the connector shafts 19 respectively, around which and between each spoke 11 and blade 16 is sandwiched the blade spring 21 in a compressed state, the blades 16 can be stably worked, corresponding to varying wind power. Namely, in the case of a large pitch angle, one side of the blade 16 abuts on the spoke 11, thus maintaining the state if only the spring force of the blade spring 21 is strong to a certain degree. Therefore, the wind mill 10 can be efficiently rotated by the wind power to efficiently generate electricity. On the other hand, if the wind blows, getting an advantage over the force of the blade spring 21, the rotation of the blade 16 can be still ensured, diminishing the pitch angle, thereby preventing the possible damage to the neighbourhood of the blade 16.

Figure 4:
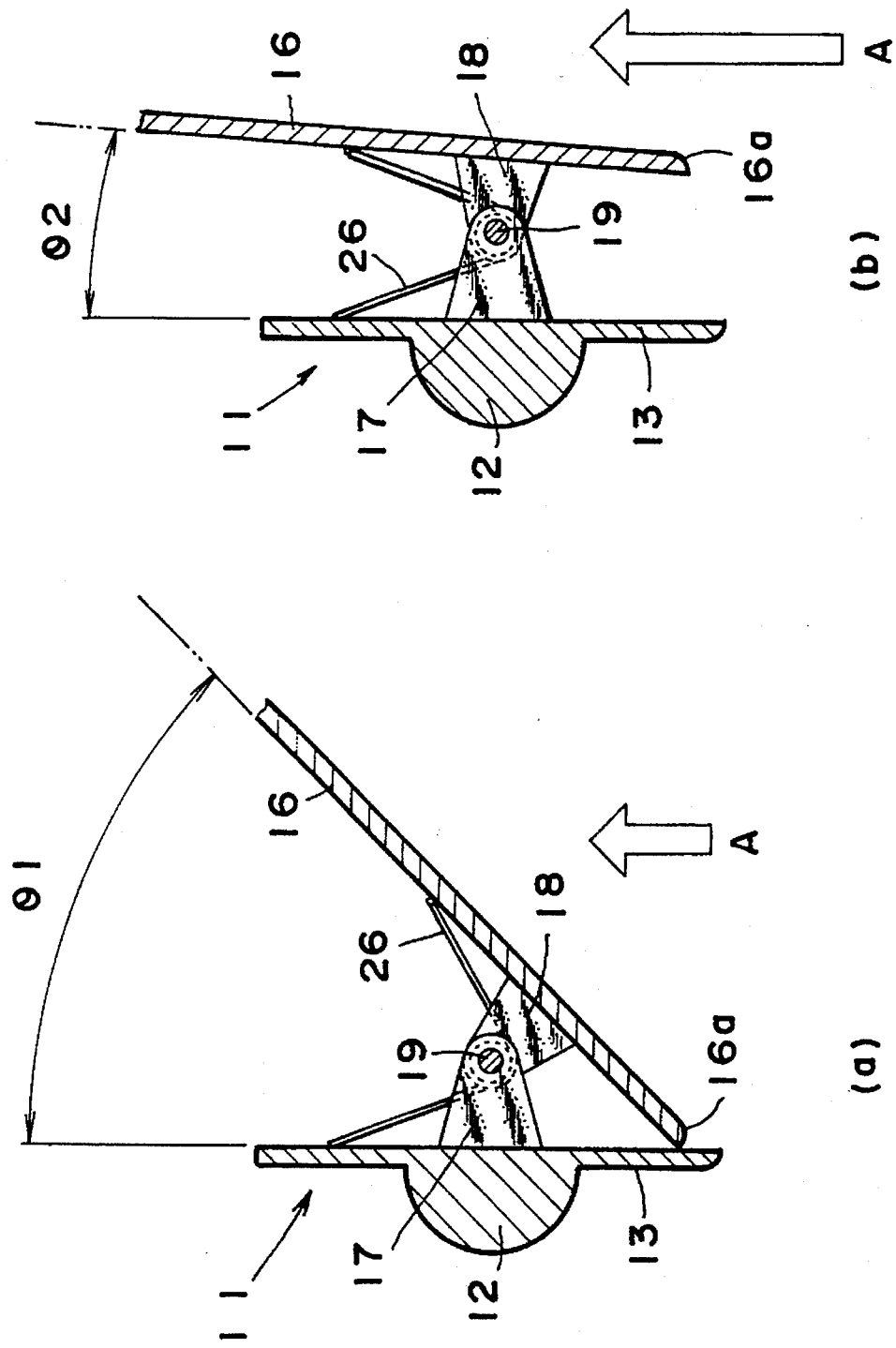
FIGS. 4(a) and 4(b) are each a section showing a spoke and blade of a second embodiment of the invention.
Figure 5:
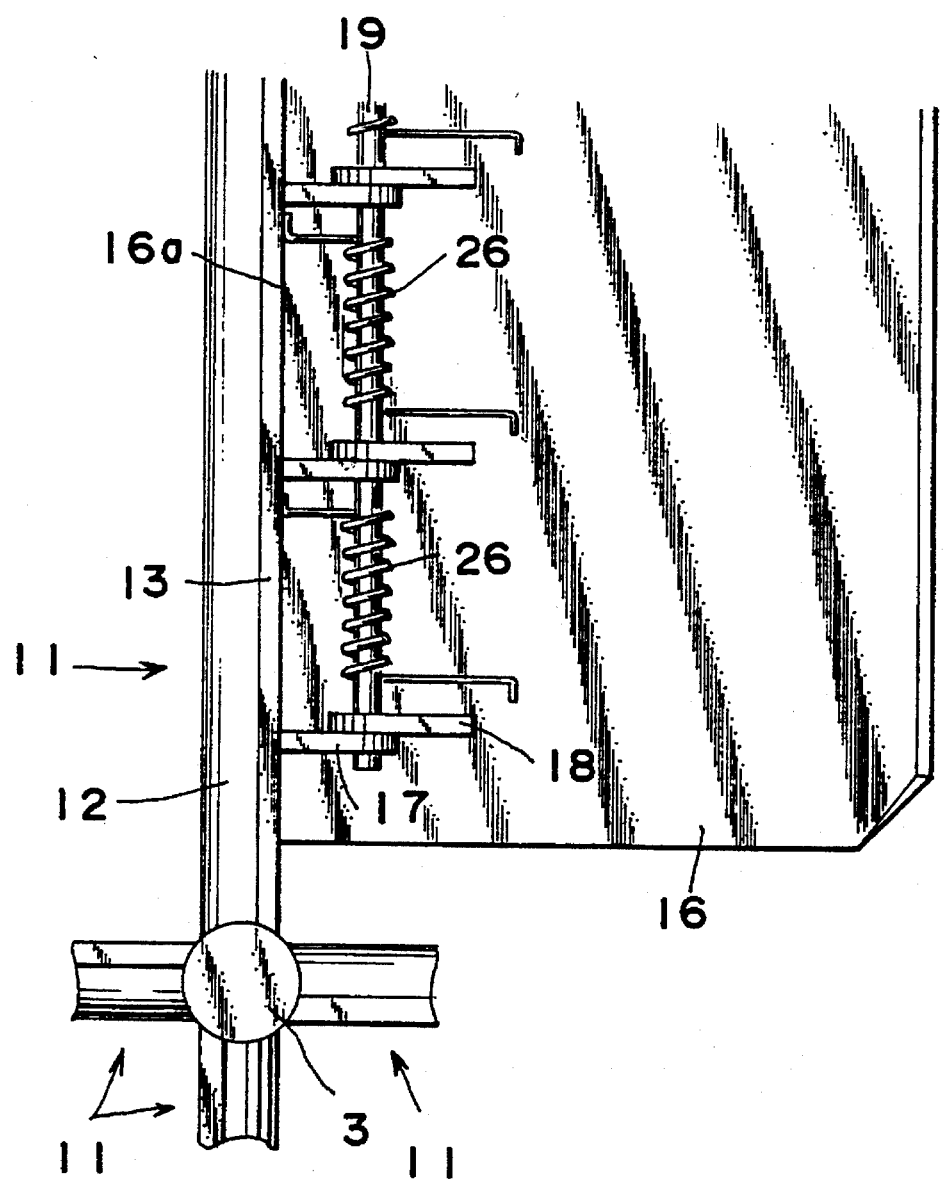
FIG. 5 is a front view showing a spoke and blade of a second embodiment of the invention.

Hereinafter is described a second embodiment of the invention with reference to FIGS. 4 and 5. The same portions as those described in the forgoing embodiment will be designated as common reference numerals, and their repeated description will be omitted.

In a second embodiment, a twisted coil spring 26 is employed for biasing the blade 16 against the spoke 11. Each twisted coil spring 26 is wound around the connector shaft 19, having one end fixed to the plate 13 of the spoke 11 and the other end to the blade 16. Owing to the twisted coil spring 26 sandwiched in a compressed state between the spoke 11 and the blade 16, the blade 16 can be biased toward the pitch angle increasing direction.

Incidentally, the present invention should not be limited to the forgoing embodiments, but may be modified within a scope of the invention. For example, the number of blades should not be limited to four, though it is preferably even. This is because any uneven number of the blades is prone to cause an ill-balance of the weight of the entire wind mill. Further, in any forgoing embodiments, adjustments of resistance force against the wind A can be suitably performed by varying the strength of the springs 21 or 26 or the number thereof.

What is claimed:

1. A wind power generator comprising:

a main generator, a power shaft which is horizontally supported, having a horizontal axis of rotation, said rotation being transferred to the main generator;

a plurality of spokes radially extending from said power shaft, each spoke comprising a shaft and a plate, having a protrusion mounted thereto;

a plurality of wind mill blades, each blade mating with a corresponding one of said plurality of pokes, and having a marginal edge and another protrusion opposite to said protrusion of the spoke;

a plurality of connector shafts, each connecting one of said plurality of blades and one of said plurality of spokes through said opposite protrusions so that each blade can be rotated around the corresponding spoke until the blade is disposed parallel to said axis of rotation of the power, shaft;

a plurality of springs surrounding the connector shafts each spring being sandwiched in a compressed state between the spoke and the blade to bias the blade toward one limit of its rotation, wherein said blade can be rotated until said marginal edge of the blade abuts on said plate of the spoke along nearly an entire length in parallel to said rotational axis of the blade, thereby defining said one limit of the rotation with an angle of the blade to the power shaft being about 45 degrees.

2. A wind power generator according to claim 1, wherein said springs are blade springs, each having one end fixed to the spoke and the other end fixed to the wind mill blade.

3. A wind power generator according to claim 1, wherein said springs are coil springs, each being wound around the connector shaft, having one end fixed to the spoke and the other end fixed to the wind mill blade.

\* \* \* \* \*

UNITED STATES PATENT AND TRADEMARK OFFICE
CERTIFICATE OF CORRECTION

PATENT NO. :   5,616,963
DATED       :   April 1, 1997
INVENTOR(S) :   Kikuchi It is certified that error appears in the above-identified patent and that said Letters Patent is hereby corrected as shown below:

In Claim 1, column 4, line 39, replace "pokes," with --spokes,--.

column 4, line 47, after "power" delete the comma (",").

column 4, line 48, after "shafts" insert a comma (--,--).

Signed and Sealed this

Fifth Day of August, 1997

Attest:

BRUCE LEHMAN

Attesting Officer

Commissioner of Patents and Trademarks